Figure 1:
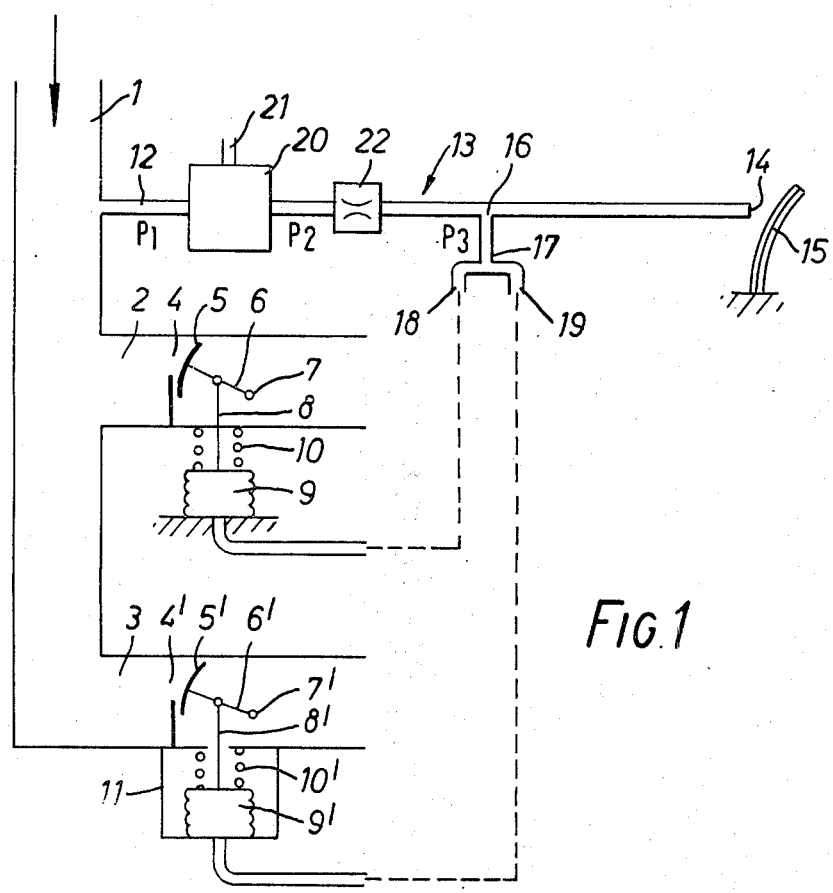

United States Patent [19]

Jensen et al.

[11] 3,906,981

[45] Sept. 23, 1975

[54] DEVICE FOR ADJUSTING A PNEUMATICALLY OPERATED OPERATING ELEMENT

[75] Inventors: Kurt Baasch Jensen, Sonderborg;
Knud Vagn Valbjorn, Nordborg;
Poul Christian Dyhr-Mikkelsen, Sonderborg, all of Denmark

[73] Assignee: Danfoss A/S, Nordborg, Denmark

[22] Filed: Mar. 13, 1974

[21] Appl. No.: 450,836

[30] Foreign Application Priority Data
Mar. 17, 1973 Germany.............................. 2313341

[52] U.S. Cl............................. 137/115; 137/533.27
[51] Int. Cl.²......................................... H01M 6/00
[58] Field of Search...................... 137/115, 533.27

[56] References Cited
UNITED STATES PATENTS
3,741,182   6/1973   Wade.................................. 137/115

Primary Examiner—Harold W. Weakley

[57] ABSTRACT

The invention relates to a pneumatic pressure regulating assembly. The assembly includes a cylindrically shaped housing having a top or cover portion with holes therein. A spindle member extends through and above the housing with the spindle portion above the housing being hollow and having an inlet opening in fluid communication with the hollow interior. A dish shaped member having a central opening is slidably mounted on the spindle member. The dish shaped member has a flange engageable with the top portion of the housing and being in surrounding relation to the holes in the cover portion. The dish shaped member is raisable by air flowing through the housing and the holes in the cover thereof so as to allow a portion of this air to be blown off and the remaining portion of the air to enter the inlet opening of the spindle member. The dish shaped member has a predetermined weight and the pressure is regulated by reason of the dish shaped member assuming different vertical positions which keeps the pressure constant by varying the amount of air blown off.

4 Claims, 3 Drawing Figures

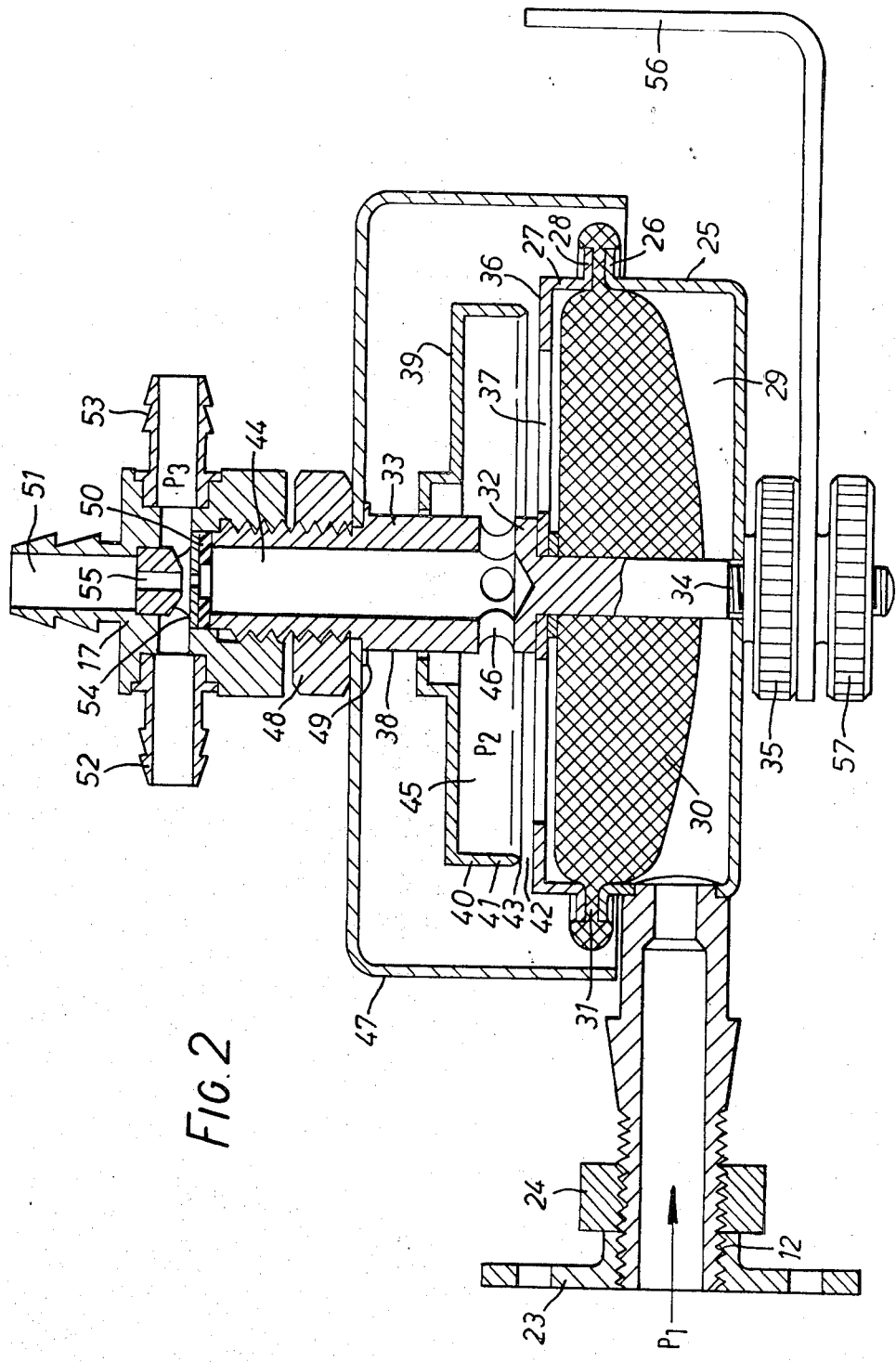

DEVICE FOR ADJUSTING A PNEUMATICALLY OPERATED OPERATING ELEMENT

The invention relates to a device for adjusting a pneumatically operated operating element which is associated with a ventilating or airconditioning installation, in which the operating element branches from a control-pressure pipe which is provided with a feed connector for connection to an air duct of the installation and with an outlet opening which can be varied, especially by thermostatic means.

In a known device of this kind an opening, which can be closed off to varying extents by means of a valve, is provided in the air duct. The control-pressure pipe is connected to the air duct upstream of the opening. The outlet opening can be closed off to a varying extent by means of a disc which may be mounted on a bimetal strip. The operating element is used for displacing the valve. The latter occupies a balanced position in which the pressure in the operating element is equal to the pressure obtaining in the duct downstream of the opening. The pressure variations in the air ducts that occur during the normal regulation of the ventilating or airconditioning installation play a subordinate role in this system, since these variations produce substantially the same effect on both sides of the valve.

The object of the present invention is to provide a device of the initially described kind in which there is considerably greater freedom of choice as regards the design of the operating elements or of the control or regulating members to be displaced by said elements.

According to the invention, this object is achieved by arranging a blowoff pressure regulator, which maintains its output pressure substantially constant, and a restrictor disposed downstream of said regulator, between the feed connector and the branch leading to the operating element.

A substantially constant output pressure is available at the output of the pressure regulator, irrespective of the normal changes in pressure in a ventilating or airconditioning installation. This output pressure drives a stream of air through the restrictor, this stream of air depending upon the size of the variable outlet opening at any particular time. Consequently, a pressure, which for practical purposes is determined only by the size of the variable outlet opening and which actuates the operating element, is set up downstream of the restrictor. The device can therefore be used for a very wide variety of operating elements irrespectively of whether the member to be actuated is influenced by pressure-changes that correspond to those occurring at the feed connector of the control-pressure pipe. Conversely, when the operating element is intended to actuate regulating members in the air duct, a second adjustment, in dependence upon the pressure fluctuations, can be superposed on this first adjustment by causing these pressure fluctuations to act directly on the regulating member.

It is particularly advantageous if a dirt filter is fitted upstream of the regulator. This dirt filter in particular ensures that the restrictor maintains its original orifice size so that the characteristics of the installation do not alter during the time in which it is operating.

In a preferred form of construction, the blow-off opening of the pressure regulator is formed between a fixed backing surface and the lower edge of the downwardly extending side wall of a dished member of predetermined weight which is mounted for vertical displacement and can be raised in dependence upon the pressure that is to be kept constant. The constant weight assumes a balanced position which determines the size of the blow-off orifice and in which the pressure obtaining in the interior of the dished member is equal to the weight of the dished member related to its effective cross-section. The dished member may be weighted as required. However, since the pressures available in a ventilating or air-conditioning installation are in any case not very great, it will generally suffice simply to use the weight of the dished member itself.

It is advisable to connect the interior of the dished member to the feed connector, by way of an inlet opening, and to the restrictor, by way of an outlet opening. The interior of the dished member thus forms a part of the control-pressure line. Consequently the air to be blown off can reach the exterior along the shortest path.

Particular advantage is achieved by providing the inlet opening below the dished member and by this opening occupying a substantial part of the cross-section of the dished member. The air is thus directed in a substantially uniform manner into the interior of the dished member at a relatively low velocity, so that the position of the dished member is virtually determined only by the static pressure obtaining within it.

In particular, a horizontally extending filter element having a cross-section corresponding to that of the dished member may be arranged below the inlet opening. This filter element not only holds back particles of dirt but also ensures that the air is uniformly distributed when it enters the interior of the dished member and is therefore able to issue by way of the blow-off opening in a uniform member.

In this arrangement, the edge of the filter element may be clamped between a lower part of the casing that is provided with the feed connector, and an upper part of the casing that includes the backing surface and the inlet opening, clamping being achieved by means of a clamping device which presses the parts against each other. The edge of the filter element then also serves to seal off the casing chamber from the atmosphere.

In a preferred form of construction, the dished member is guided on a vertical stem which has an upwardly directed bore and in which the outlet opening, constituted by radial orifices, is formed. This double function of the stem results in a particularly simple construction.

If the stem has a shoulder for supporting the upper part of the casing, and a screw-thread for receiving a nut bearing against the lower part of the casing, it can perform the further function of acting as the clamping device.

A fixing bracket may also be attached to the stem. If the bracket is secured to a wall or some other fixed part of a structure, all the parts of the device can be held by means of the stem.

Expediently, the bore in the stem is covered at the top by an apertured disc constituting the restrictor. The restrictor is readily accessible at this position. It can be cleaned, or replaced by another restrictor. Furthermore at its top the stem may carry a distributor which has a first port for connection of the variable outlet opening, and at least a second port for the connection of an operating element. It is often desirable to design the distributor for the connection of a plurality of operating elements. In this way it becomes possible to bring all the important components of the device together on the stem.

Particular advantage is achieved if a restricting bore, coaxial with the apertured disc, is provided in the inlet to the first port. With the help of this restricting bore part of the dynamic pressure of the stream of air issuing from the apertured disc can be converted into static pressure.

It is also advantageous if the lower edge of the side wall of the dished member is of sharply pointed cross-section. The blow-off opening is then delimited by a line, at least at one of its sides. This arrangement removes the danger of a suction action, which would pull the dished member downwards, being set up below the edge.

Figure 3:
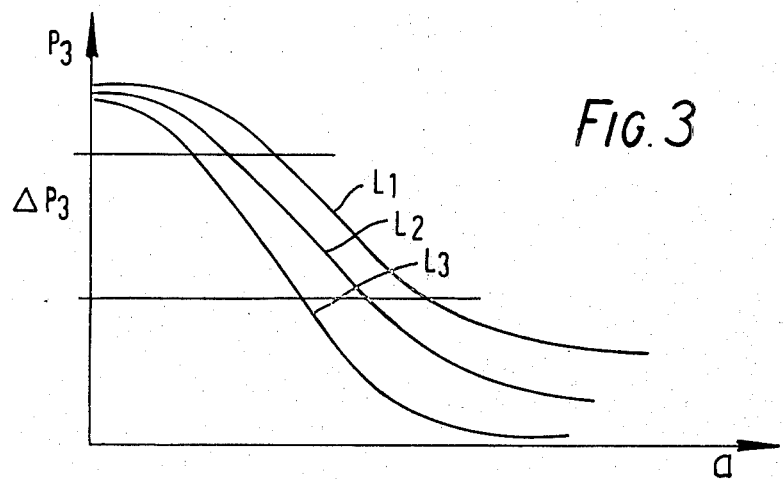

The invention will now be described in greater detail by reference to an embodiment illustrated in the drawing, in which:

FIG. 1 is a diagrammatic illustration of the device in accordance with the invention, FIG. 2 shows, in longitudinal section, a form of construction of important parts of the device of the invention, and FIG. 3 is a graph showing the relationship between the pressure P in the operating element and the size of the variable outlet opening.

In an air-conditioning installation, treated air having a particular temperature and humidity is passed through a main duct 1 to a plurality of distributor ducts 2 and 3. In the distributor duct 2 is an opening 4 which can be covered to varying extent by a part-cylindrical member 5. The part-cylindrical member is pivotable by means of a rod 6 about an axis 7 which coincides with the axis of the cylinder, part of which is constituted by the member 5. The pull rod 8 of a pneumatic operating element 9 engages the rod 6, and a spring 10 counteracts the movement of the operating element. In the distributor duct 3 there is provided a similar device, the components of which are designated by the same numerals as the components of the above-described device but with an apostrophe added in each case. The operating element 9' is accommodated in a chamber 11 which communicates with the duct 3 downstream of the opening 4'. In this device, the position of the part-cylindrical member 5' is also influenced by the pressure in the duct 3 that acts on the top face of the operating element 9'. The operating elements 9 and 9' are here constituted by bellows elements, but they may be of any other required known form.

Connected to the main duct 1 is a feed port 12 of a control-pressure pipe 13 which has a variable outlet opening 14 which can be covered to varying extent with the aid of a bimetal strip 15. Provided on a branch 16 of this pipe is a distributor 17 from which two flexible pipes 18 and 19 extend to the operating elements 9 and 9'.

Between the feed port 12 and the branch 16 is fitted a pressure regulator 20 which has a blowoff opening 21, and downstream of this regulator is a restrictor 22. Since, despite fluctuating pressure in the main duct 1, the pressure downstream of the pressure regulator 20 is kept constant, there occurs at the restrictor 22 a pressure-drop which is dependent upon the size of the outlet opening 14 and which leads to a specific pressure at the branch 16.

In the arrangement shown in FIG. 2, there is provided a feed port 12 which is provided with a flange 23 and a lock nut 24 for the purpose of connecting said port to a duct 1. The feed port is secured to the lower part 25 of the casing, which lower part is of circular cross-section and is provided with a flange 26. Together with the upper part 27 of the casing that has a co-operating flange 28, the lower part forms a chamber 29 in which is provided a filter element 30. The edge 31 of this element that is located between the flanges 26 and 28 acts as a seal and for securing the filter element when the casing parts 25 and 27 are pressed against each other between a shoulder 32 on a stem 33 and a nut 37 screwed on to a thread 34. At its top the upper part of the casing forms a backing surface 36 and has, within this surface, an inlet opening 37 in the form of a plurality of orifices of large area.

A dished member 39 of predetermined weight is guided vertically on an upper portion 38 of the stem 33. The dished member has side walls 40, the lower edge 41 of which, together with the backing surface 36, forms an annular blow-off opening 42. In cross-section the lower edge 41 tapers to a point 43.

The stem 33 has an upwardly extending bore 44 which communicates with the interior 45 of the dished member 39 by way of an outlet opening 46 in the form of radial orifices. A protective cover 47 is likewise clamped against a shoulder 49 of the stem 33 with the aid of a nut 48.

The distributor 17 is screwed on to the upper end of the stem 33, a sealing ring 50 being fitted between these two parts. The distributor has a first port 51 for the connection of a hose leading to the opening 14, and two ports 52 and 53 for the connection of the pipes 18 and 19. The restrictor 22 in the form of an apertured disc 54 is fitted within the distributor 17 on the end-face of the stem that surrounds the bore 44. Disposed coaxially with the restrictor is a further restricting bore 55 in the inlet to the port.

When air of variable pressure P1 is passed through the feed connector 12, it is distributed in the chamber 29 and passes through the filter element 30 in which it is further uniformly distributed, and through the inlet opening 37 and thence into the interior 45 of the dished member 39. As this happens, the dished member 39 is raised until the weight of this member is equal to the pressure P2 in the interior 45 of the member times the effective cross-sectional area of the dished member. In this position of balance a certain quantity of air is discharged outwardly through the blow-off gap 42. The rest of the air, having a constant pressure P2, passes through the outlet opening 46 and the duct 44 to the apertured disc 54. The pressure-drop at this apertured disc, which depends upon the size of the variable opening 14, leads to a pressure P3 in the distributor ports 52 and 53, which pressure is thus a variable control pressure.

In FIG. 3 this pressure P3 is plotted against the distance a between the bimetal strip 15 and the opening 14. For a particular length of the connecting hose between the port 51 and this opening 14 there results the function L1. With a hose of smaller length there results the function L2, and for a very short hose, the function L3. In all cases there is obtained a proportional range $\Delta P3$, in which approximately proportional relationships prevail. By replacing the insert containing the restricting bore 55 by another insert, it is of course possible to adapt the device to suit various lengths of hose in such manner that the same function occurs in all cases.

A bracket 56 is likewise secured to the stem 33 with the aid of a nut 57. This bracket is used for securing the device to a fixed part of a structure or to a wall.

Instead of automatic regulation by means of bimetal strips, it is also possible to make an adjustment by hand or to effect regulation in dependence upon the humidity or any other factor.

I claim:

1. A pneumatic pressure regulating assembly comprising a chamber housing having a top portion with at least one hole therein, a hollow spindle member having an inlet opening in fluid communication with the interior thereof, a dish shaped member having a central opening and being slidably mounted on said spindle member above said inlet opening, said dish shaped member having a flange engageable with said top portion and in surrounding relation to said housing hole, said dish shaped member being raisable by air flowing from said housing through said hole thereof to allow a portion of said air to be blown off and a portion of said air to enter said inlet opening of said spindle member.

2. A pneumatic pressure regulating assembly according to claim 1 including a filter in said housing.

3. A pneumatic pressure regulating assembly according to claim 1 wherein said chamber housing has inlet conduit means.

4. A pneumatic pressure regulating assembly according to claim 2 wherein said chamber housing and said top portion are separate members, said filter having the edges thereof clamped between said separate members, and means biasing said separate members towards each other.

* * * * *